Dec. 23, 1969    E. R. WINDAHL    3,485,395
DIPPER ACTUATOR FOR PULLSHOVELS
Filed March 3, 1967
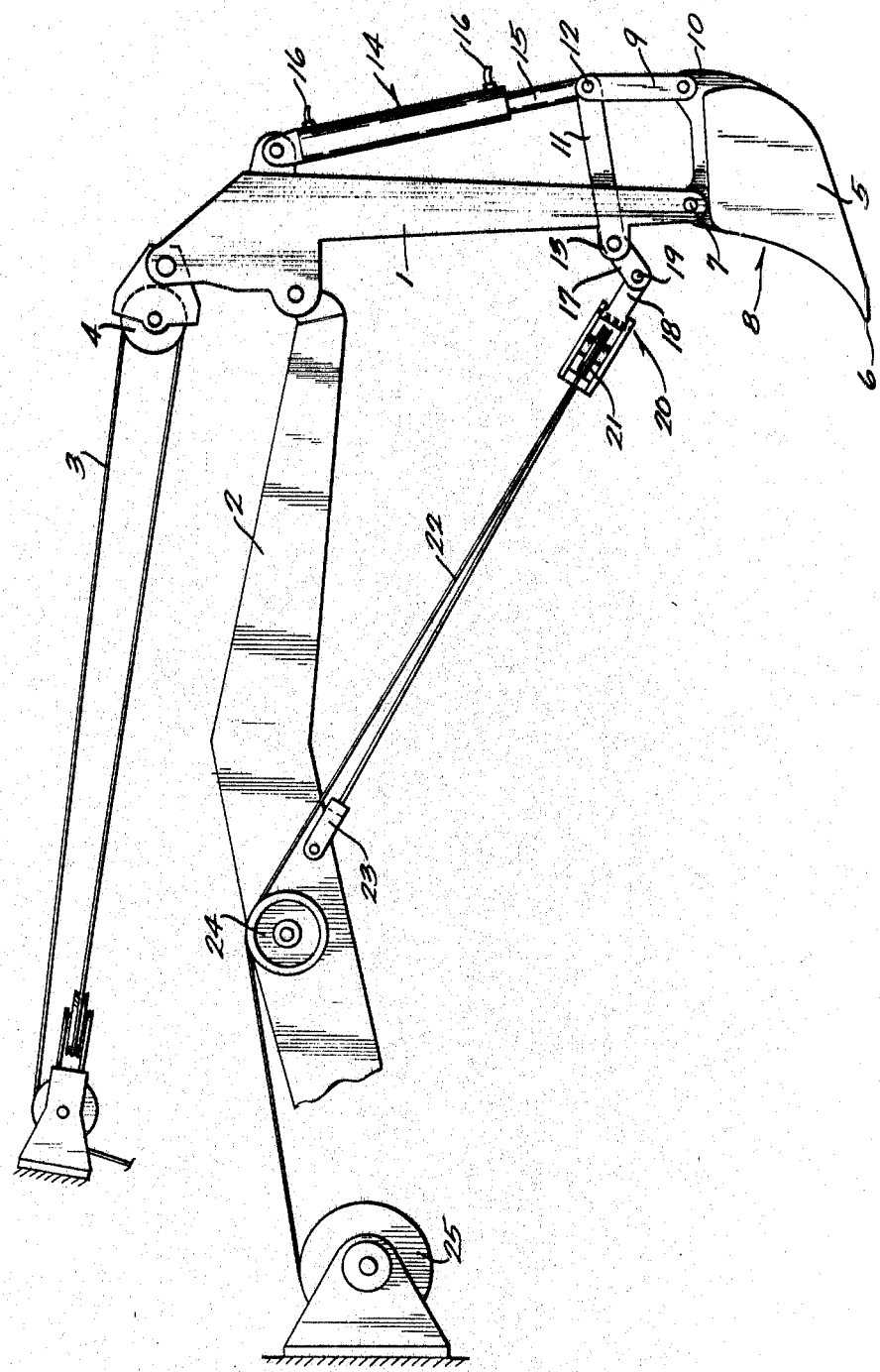
Inventor
EVERETT R. WINDAHL
BY
Andrus & Starke
Attorneys United States Patent Office 3,485,395
Patented Dec. 23, 1969

3,485,395
DIPPER ACTUATOR FOR PULLSHOVELS
Everett R. Windahl, Green Bay, Wis., assignor to Northwest Engineering Corporation, Green Bay, Wis., a corporation of Wisconsin
Filed Mar. 3, 1967, Ser. No. 620,517
Int. Cl. E02f 3/70
U.S. Cl. 214—138       5 Claims

ABSTRACT OF THE DISCLOSURE

An earth handling dipper connected through a four bar linkage to actuating mechanism including an hydraulic cylinder and piston attached to a dipper handle. A drag cable operates through a sheave attached to the top link to assist the piston in moving the dipper.

---

The present application is a companion to an application by Robert J. Burkart, entitled Dipper Actuator for Pullshovels with Special Cable Positioning, Ser. No. 620,516, filed on even date herewith, and assigned to a common assignee.

This invention relates to a dipper actuator for pullshovels used in earth moving equipment.

More particularly, the present invention is an improvement on the bucket actuator disclosed in various embodiments in the U.S. Pilch Patent 2,813,645, entitled "Earth Moving Apparatus or the Like." In that patent, the bucket and dipper stick assembly are hydraulically actuated relative to a fixed boom, and a four bar linkage is utilized between the bucket and dipper stick.

The present improvement utilizes some of the features disclosed in Pilch Patent 2,813,645. In accordance with the invention, the upper link is extended to form an arm to which is connected a sheave. A drag rope extends from the sheave to the boom and a winch mechanism. Pulling force on the drag rope will thereby act through the upper link to assist in digging.

The accompanying drawing illustrates the best mode presently contemplated by the inventor for carrying out the invention, and comprises a single figure which is a schematic side elevation of an apparatus constructed in accordance with the invention.

As shown in the drawing, the invention includes a dipper handle 1 which is pivotally connected in its upper portion to a boom 2. Only a portion of one end of boom 2 is shown, it being understood that the other boom end is connected to a self-propelled vehicle which includes the usual well-known cab and control mechanisms.

Dipper handle 1 is adapted to be pivotally moved relative to boom 2, as by a cable 3 which extends from the vehicle and over a pulley 4 attached to the upper end of handle 1.

A bucket-like dipper 5 having a forwardly extending digging edge 6 is mounted to the lower end of dipper handle 1 by a pivotal connection 7 which is disposed adjacent the upper portion of the front or open end 8 of the dipper. An upstanding link 9 is pivotally connected at its lower end to the upper portion of the closed rear end 10 of dipper 5, and is spaced rearwardly from handle 1 and pivotal connection 7. A second link 11, subsequently called a padlock link, is mounted at its rearward end to the upper end portion of link 9, as by pivotal connection 12 and extends forwardly in a slightly downwardly horizontal direction to a lug 13 mounted on the forward side of dipper handle 1. The forward end of link 11 is pivotally secured to lug 13. The structure described provides a four bar linkage which is generally similar to that disclosed in above-mentioned Patent 2,813,645.

For actuation of dipper 5, a hydraulic cylinder 14 is pivotally connected at its upper end to the upper end portion of dipper handle 1. A piston 15 extends downwardly from cylinder 14 and is mounted at pivotal connection 12. Actuation of piston 15, as via suitable hydraulic lines 16, will cause dipper 5 to pivot about connection 7 into digging or retraction positions.

In accordance with the present invention, means are provided to assist the hydraulic dipper actuation mechanism during the digging cycle, thereby permitting use of a smaller diameter cylinder 14 and piston 15 than was heretofore possible. For this purpose, padlock link 11 is provided with an outer arm 17 which extends forwardly from dipper handle 1 and from the pivotal connection at lug 13. Arm 17 is inclined downwardly slightly from the body of link 11 and has one end of a bail link 18 pivotally attached thereto, as at 19. The other end of link 18 is fixedly attached to a cage-like padlock 20 which serves to rotatably house a sheave 21. A drag rope or cable 22 passes over sheave 21 to form a loop, with one end of cable 22 being attached to boom 2, as at 23, and the other end passing over a boom pulley 24 and extending to a suitable take-up drum or winch 25 on the vehicle.

When winch 25 is operated to apply a tightening force to cable 22, and when cylinder-piston assembly 14, 15 is simultaneously actuated to move dipper 5 toward a digging position, padlock 20 will exert a force through bail link 18 and arm 17 which pivots arm 17 away from dipper 5 and assists in pivoting padlock link 11.

While arm 17 has been described as being an integral extension of link 11, arm 17 could be a separate member fixedly pivoted with link 11 about the pivotal connection at lug 13 without departing from the spirit of the invention.

Various modes of carrying out the invention are contemplated as being within the scope of the following claims particularly pointing out and distinctly claiming the subject matter which is regarded as the invention.

I claim:
1. In a pullshovel device having a boom, a dipper handle pivotally connected to said boom, a dipper pivotally connected at its forward open end to one end portion of said dipper handle, a four-bar linkage for said dipper end including portions of said dipper and said dipper handle and an upper link pivotally attached to said dipper handle, and actuating means connected between said dipper handle and said four-bar linkage for pivoting said dipper at its said forward pivotal connection with said dipper handle, the improvement comprising:
 (a) a member forming an effective extension of said upper link adjacent said dipper handle and with said member extending forwardly of said dipper handle,
 (b) and means pivotally connected to said member forwardly of said dipper handle with said last-named means being actuable to apply a pulling force on said member and link to pivot said member away from said dipper and to thereby assist said actuating means in pivoting said dipper.

2. In a pullshovel device having a boom, a dipper handle pivotally connected to said boom, a dipper pivotally connected adjacent its forward open end to one end portion of said dipper handle, a first link pivoted at one end to said dipper at a position spaced from said dipper handle, a second link pivoted at the other end of said first link and extending to a pivotal connection with said dipper handle, and actuating means connected between said dipper handle and one of said links for pivoting said dipper at its forward pivotal connection with said dipper handle, the improvement comprising:
 (a) an arm forming an effective extension of said second link adjacent said dipper handle and with said arm extending forwardly of said dipper handle,
 (b) and drag means pivotally connected to said arm forwardly of said dipper handle with said drag means being actuatable to apply a pulling force on said arm and said second link to pivot said arm away from said dipper and to thereby assist said actuating means in pivoting said dipper.

3. The device of claim 2 wherein said drag means comprises:
 (a) a sheave pivotally connected to said arm,
 (b) and a drag cable passing over said sheave to form a loop, with one end of said cable being fixedly attached to said boom and the other end portion thereof being wound on a take-up means.

4. The device of claim 3 wherein: said arm is inclined from the body of said second link.

5. In a pullshovel device having a boom, dipper handle pivotally connected to said boom, a dipper pivotally connected adjacent its open end to one end portion of said dipper handle, a first link pivotal at one end to said dipper at a position spaced from said dipper handle, a second link pivoted at the other end of said first link and extending to a pivotal connection with said dipper hadle, and actuating means connected between said dipper handle, and one of said links for pivoting said dipper at its pivotal connection with said dipper handle, the improvement comprising:
 (a) an arm forming an effective extension of said second link with said arm being inclined from the body of said second link and extending away from said dipper handle,
 (b) a bail link pivotally attached at one end to said arm,
 (c) a padlock cage fixedly attached to the other end of said bail link,
 (d) a sheave disposed in said cage,
 (e) a drag cable passing over said sheave to form a loop, with one end of said cable being fixedly attached to said boom and the other end portion thereof being wound on a take-up means,
 (f) and a pulley on said boom over which the said other end portion of said cable passes.

References Cited
UNITED STATES PATENTS 3,141,561  7/1964  Bjorklund _____ 214—138

HUGO O. SCHULZ, Primary Examiner